(12) United States Patent
McGuire et al.

(10) Patent No.: US 8,857,293 B2
(45) Date of Patent: Oct. 14, 2014

(54) POWER TRANSMITTING COMPONENT WITH MULTI-PART HOUSING ASSEMBLY HAVING CONTINUOUS SEALING FLANGE

(71) Applicant: American Axle & Manufacturing, Inc., Detroit, MI (US)

(72) Inventors: Scott P. McGuire, Madison Heights, MI (US); Kevin R. Beutler, Columbiaville, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 71 days.

(21) Appl. No.: 13/792,355

(22) Filed: Mar. 11, 2013

(65) Prior Publication Data

US 2014/0251080 A1 Sep. 11, 2014

(51) Int. Cl.
*F16H 57/02* (2012.01)
*F16H 57/021* (2012.01)

(52) U.S. Cl.
CPC ................................... *F16H 57/021* (2013.01)
USPC ...................................................... 74/606 R

(58) Field of Classification Search
CPC ....................... F16H 2057/02043; F16H 57/02
USPC ................... 74/11, 15.69, 15.88, 606 R, 607; 180/378; 464/170, 177, 178
IPC ...................................................... F16H 57/02
See application file for complete search history.

(56) References Cited

U.S. PATENT DOCUMENTS

| | | | |
|---|---|---|---|
| 2,015,969 A | 10/1935 | Schildknecht | |
| 5,582,065 A | 12/1996 | Roth et al. | |
| 5,913,547 A | 6/1999 | Fernandez | |
| 6,070,495 A | 6/2000 | Kuroda et al. | |
| 6,675,676 B2 | 1/2004 | Beutler | |
| 6,729,207 B2 | 5/2004 | Allmandinger et al. | |
| 6,845,837 B2 * | 1/2005 | Ohashi et al. | 180/235 |
| 7,325,821 B2 | 2/2008 | Myers et al. | |
| 7,611,435 B2 | 11/2009 | Beutler | |
| 2004/0216556 A1 | 11/2004 | Smith et al. | |
| 2009/0078083 A1 * | 3/2009 | Nishimoto | 74/606 R |
| 2010/0216593 A1 | 8/2010 | Ekonen et al. | |
| 2012/0198961 A1 * | 8/2012 | Diez | 74/606 R |
| 2013/0303326 A1 * | 11/2013 | Downs et al. | 475/221 |

FOREIGN PATENT DOCUMENTS

WO    WO-9317268 A1    9/1993

\* cited by examiner

*Primary Examiner* — Thomas R. Hannon
*Assistant Examiner* — Adam D Rogers
(74) *Attorney, Agent, or Firm* — Harness, Dickey & Pierce, P.L.C.

(57) ABSTRACT

A housing assembly for a power transmitting component that includes first and second housing structures, which define a cavity and a shaft bore, and a gasket. The first housing structure includes a pair of first end walls, a first seal flange, and a pair of saddles. The first seal flange extends about the cavity. The saddles are arch-shaped and coupled to the first end walls. The shaft bore is formed through the first end walls and the saddles. The second housing structure includes a pair of second end walls, and a second seal flange. The second seal flange extends about the cavity and is configured to abut the first seal flange. The second end walls define saddle recesses into which the saddles are received. The gasket is received between the first and second seal flanges and between the saddles and surfaces of the saddle recesses.

18 Claims, 7 Drawing Sheets

POWER TRANSMITTING COMPONENT WITH MULTI-PART HOUSING ASSEMBLY HAVING CONTINUOUS SEALING FLANGE

FIELD

The present disclosure relates to a power transmitting component with a multi-part housing assembly having a continuous sealing flange.

BACKGROUND

This section provides background information related to the present disclosure which is not necessarily prior art.

At times it is necessary to design a housing assembly for a power transmitting component such that two housing components are joined at an interface that intersects a shaft bore along an axis that is parallel to the shaft bore. Stated another way, the interface between the housing components is disposed in a plane that intersects a shaft bore. Typically, such housing assemblies are designed and constructed such that there is an interrupted gasket sealing surface due to the T-shaped interface between flanges on the mating housing components and a circular seal or plug surface that is associated with the shaft bore. It is known in the art that it can be challenging to engineer and manufacture such T-shaped interfaces in a leak-free manner. Accordingly, there remains a need in the art for a power transmitting component with a multi-part housing assembly having a continuous sealing flange.

SUMMARY

This section provides a general summary of the disclosure, and is not a comprehensive disclosure of its full scope or all of its features.

In one form, the present teachings provide a power transmitting component that includes a housing assembly and a shaft. The housing assembly has first and second housing structures and a gasket. The first and second housing structures are fixedly but removably coupled to one another to define a cavity and a shaft bore. The shaft bore is formed through the housing assembly along a shaft axis and intersects the cavity. The first housing structure has a first wall member, a pair of first end walls, a pair of first bearing bulkheads, a first seal flange, and a pair of saddles. The first end walls are coupled to opposite sides of the first wall member and cooperate with the first wall member to define a first portion of the cavity. The first bearing bulkheads are coupled to the first wall member and are spaced apart along the shaft axis. The first seal flange is coupled to the first wall member and the first end walls and extends about the cavity. Each of the saddles is arch-shaped and is coupled to a corresponding one of the first end walls. The shaft bore is formed through the first end walls and the saddles. The second housing structure has a second wall member, a pair of second end walls, a pair of second bearing bulkheads, and a second seal flange. The second end walls are coupled to opposite sides of the second wall member and cooperate with the second wall member to define a second portion of the cavity. The second bearing bulkheads are coupled to the second wall member and are spaced apart along the shaft axis. Each of the second bearing bulkheads cooperates with a corresponding one the first bearing bulkheads to define a respective portion of the shaft bore. The second seal flange is coupled to the second wall member and the second end walls and extends about the cavity. The second seal flange is configured to abut the first seal flange. The second end walls define saddle recesses into which the saddles are received. The gasket is received between the first and second seal flanges and between the saddles and surfaces of the saddle recesses to thereby seal an interface between the first and second housing structures. The shaft is received between the first and second bearing bulkheads and is rotatable relative to the housing assembly.

In another form, the present teachings provide a power transmitting component having a housing assembly, an input member, a differential assembly, a shaft, a ring gear, and a pinion gear. The housing assembly has first and second housing structures and a gasket. The first and second housing structures are fixedly but removably coupled to one another to define a cavity and a shaft bore. The shaft bore is formed through the housing assembly along a shaft axis and intersects the cavity. The first housing structure has a first wall member, a pair of first end walls, a pair of first bearing bulkheads, a first seal flange, and a pair of saddles. The first end walls are coupled to opposite sides of the first wall member and cooperate with the first wall member to define a first portion of the cavity. The first bearing bulkheads are coupled to the first wall member and are spaced apart along the shaft axis. The first seal flange is coupled to the first wall member and the first end walls and extends about the cavity. Each of the saddles is arch-shaped and is coupled to a corresponding one of the first end walls. The shaft bore is formed through the first end walls and the saddles. The second housing structure has a second wall member, a pair of second end walls, a pair of second bearing bulkheads, and a second seal flange. The second end walls are coupled to opposite sides of the second wall member and cooperate with the second wall member to define a second portion of the cavity. The second bearing bulkheads are coupled to the second wall member and are spaced apart along the shaft axis. Each of the second bearing bulkheads cooperates with a corresponding one the first bearing bulkheads to define a respective portion of the shaft bore. The second seal flange is coupled to the second wall member and the second end walls and extends about the cavity. The second seal flange is configured to abut the first seal flange. The second end walls define saddle recesses into which the saddles are received. The gasket is received between the first and second seal flanges and between the saddles and surfaces of the saddle recesses to thereby seal an interface between the first and second housing structures. The input member is received in the first housing structure for rotation about an input member axis that is parallel to the shaft axis. The differential assembly is received in the first housing and configured to be driven by the input member for rotation about the input member axis. The shaft is received between the first and second bearing bulkheads and is rotatable relative to the housing assembly. The ring gear is mounted on the shaft. The pinion gear is supported for rotation in the second housing structure and is meshingly engaged to the ring gear.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
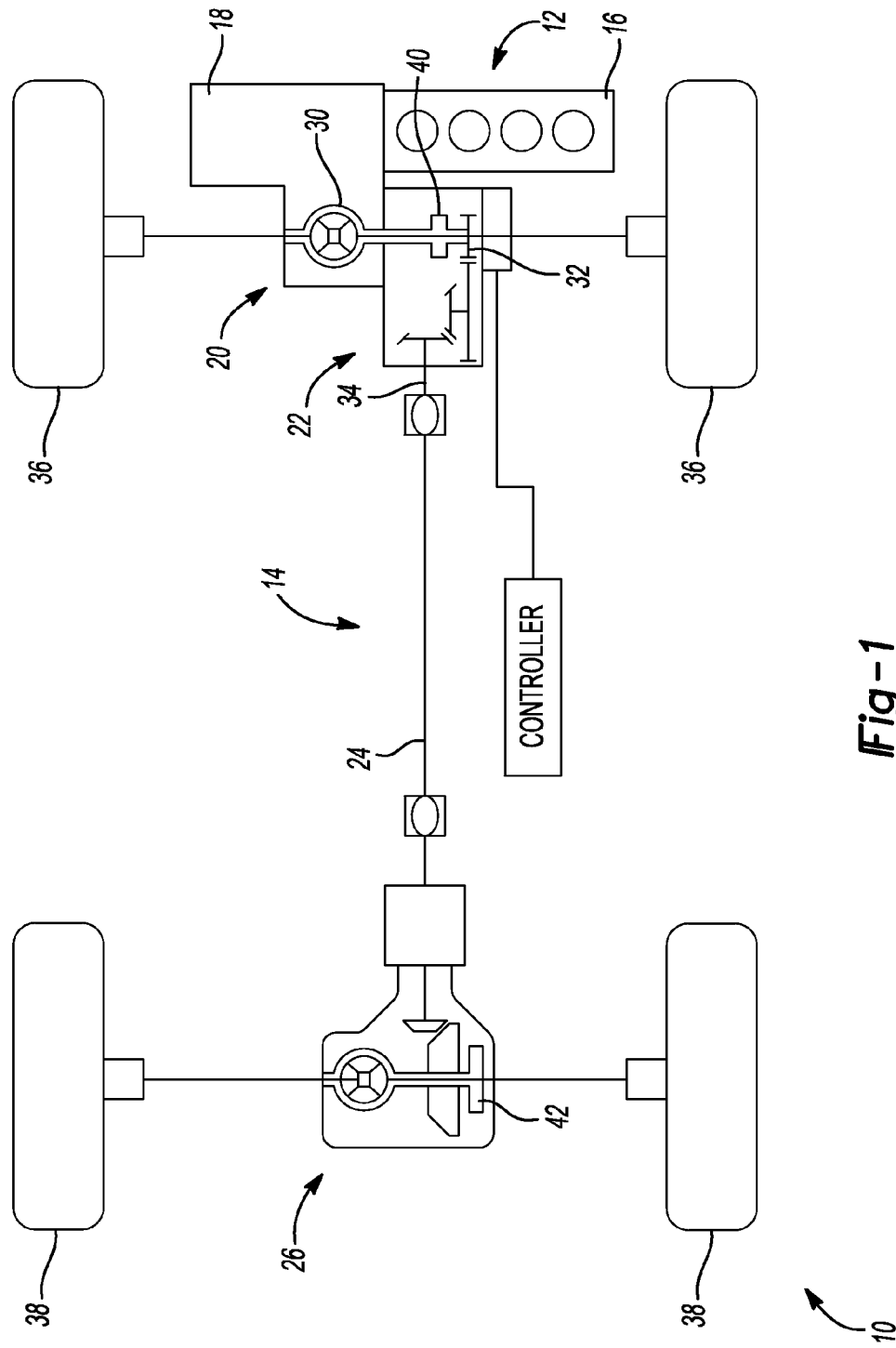
FIG. 1 is a schematic illustration of an exemplary vehicle having a power transmitting component constructed in accordance with the teachings of the present disclosure.
Figure 8:
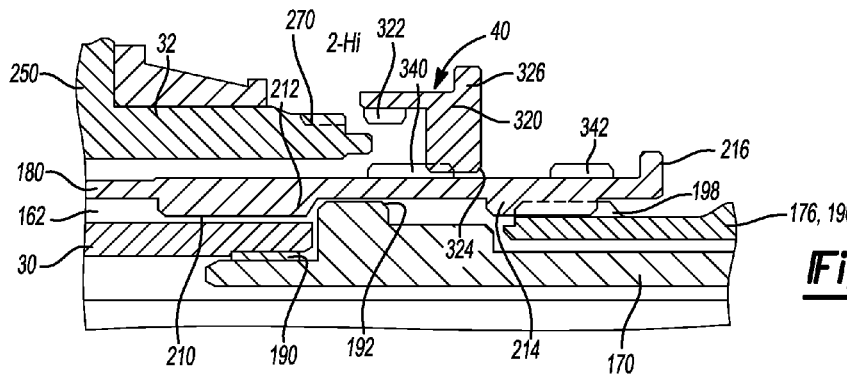
FIG. 8 is an enlarged portion of FIG. 4 illustrating a range collar in a first range position and a clutch (mode) collar in a first mode position such that a drive train of the vehicle of FIG. 1 is operated in a two-wheel, high-range drive mode.
Figure 10:
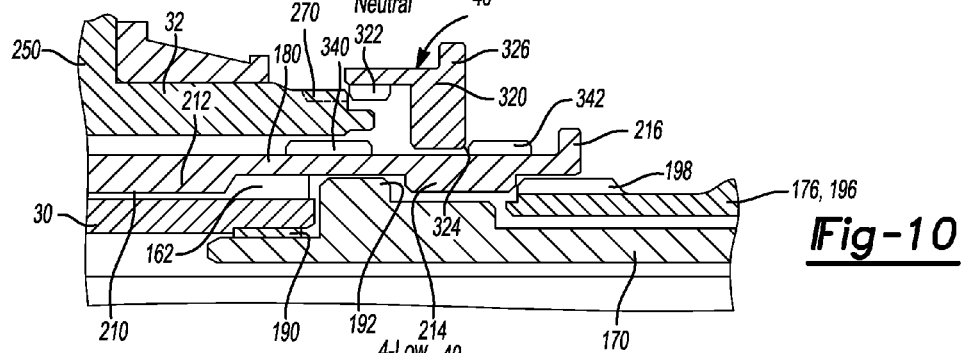
Figure 11:
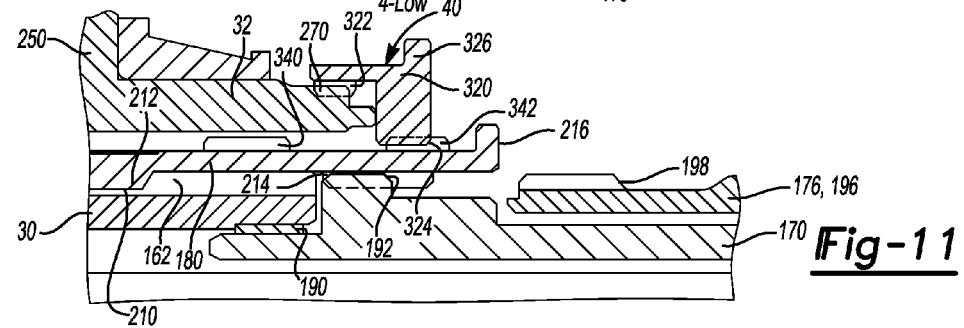

FIG. 10 is a view similar to that of FIG. 8 but illustrating the range collar in a second range position and the clutch (mode) collar in the second mode position such that a drive train of the vehicle of FIG. 1 is operated in a neutral, non-driven mode; and FIG. 11 is a view similar to that of FIG. 8 but illustrating the range collar in a third range position and the clutch (mode) collar in the second mode position such that a drive train of the vehicle of FIG. 1 is operated in a four-wheel, low-range drive mode.

Corresponding reference numerals indicate corresponding parts throughout the several views of the drawings.

DETAILED DESCRIPTION

With reference to FIG. 1 of the drawings, an exemplary vehicle having a power transmitting component constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of an all-wheel drive configuration, but those of skill in the art will appreciate that the teachings of the present disclosure are applicable to other drive train configurations, including four-wheel drive configurations, rear-wheel drive configurations, and front-wheel drive configurations.

The drive train 14 can include a front axle assembly 20, a power take-off unit (PTU) 22, a prop shaft 24 and a rear axle assembly 26. An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26. The front axle assembly 20 and the rear axle assembly 26 could be driven on a full-time basis to drive front and rear vehicle wheels 36 and 38, respectively. It will be appreciated, however, that the drive train 14 could include one or more clutches to interrupt the transmission of rotary power through a part of the drive train 14. In the particular example provided, the drive train 14 include a first clutch 40, which can be configured to interrupt the transmission of rotary power into or through the PTU 22, and a second clutch 42, which can be configured to halt rotation of components within the rear axle assembly 26.

Figure 2:
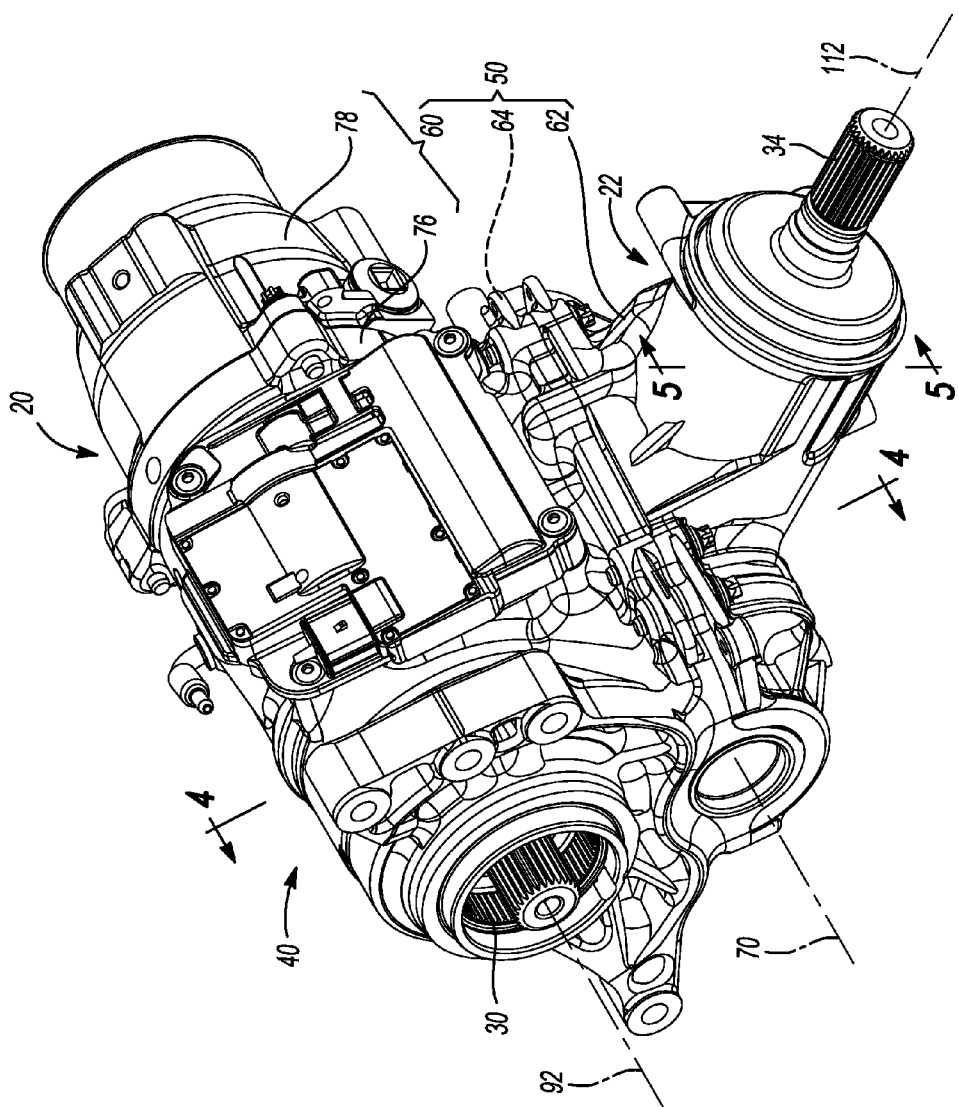
FIG. 2 is a rear perspective view of a portion of the vehicle of FIG. 1 illustrating the power transmitting component in more detail.
Figure 3:
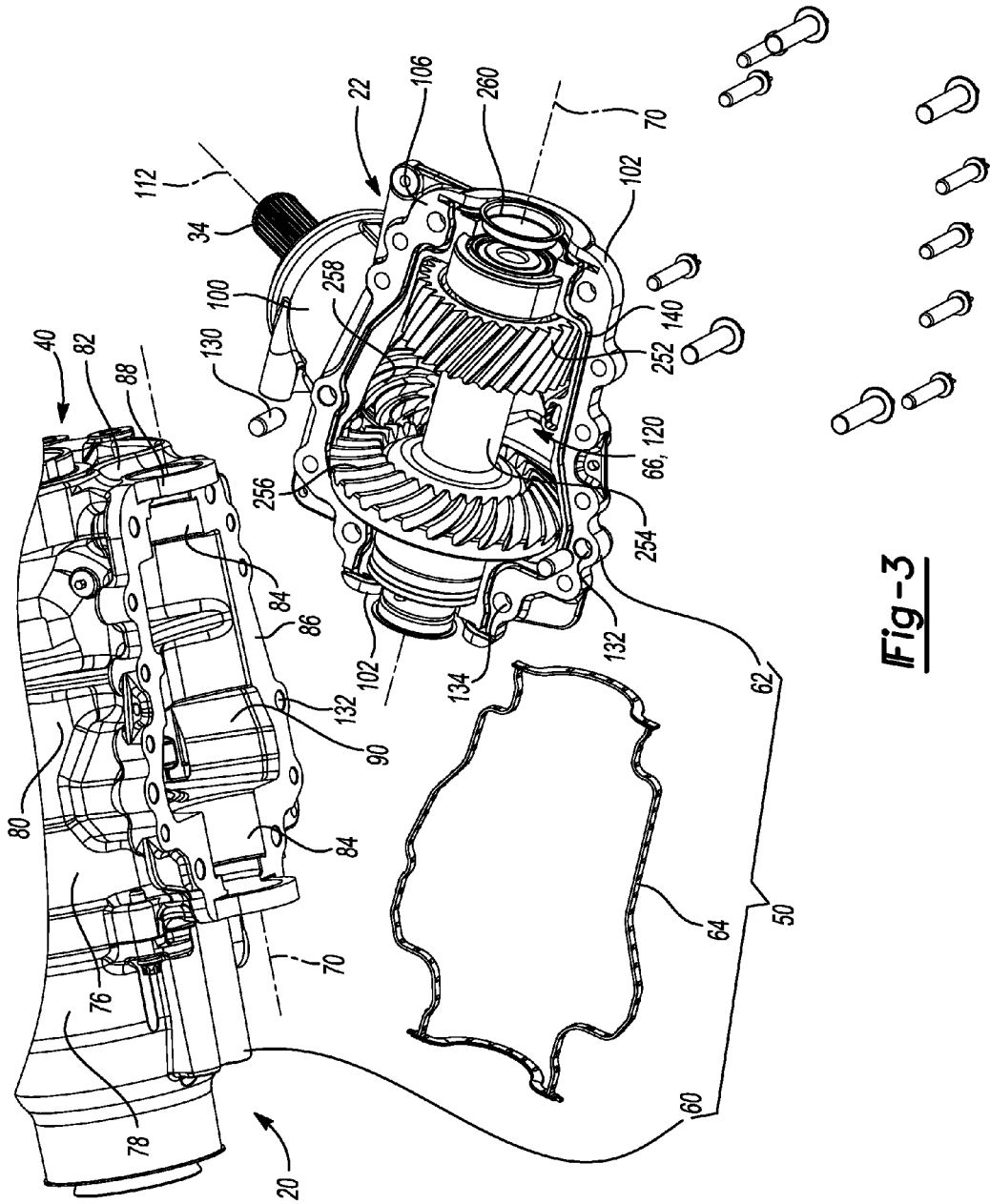
FIG. 3 is an exploded perspective view of the power transmitting component illustrated in FIG. 2.
Figure 4:
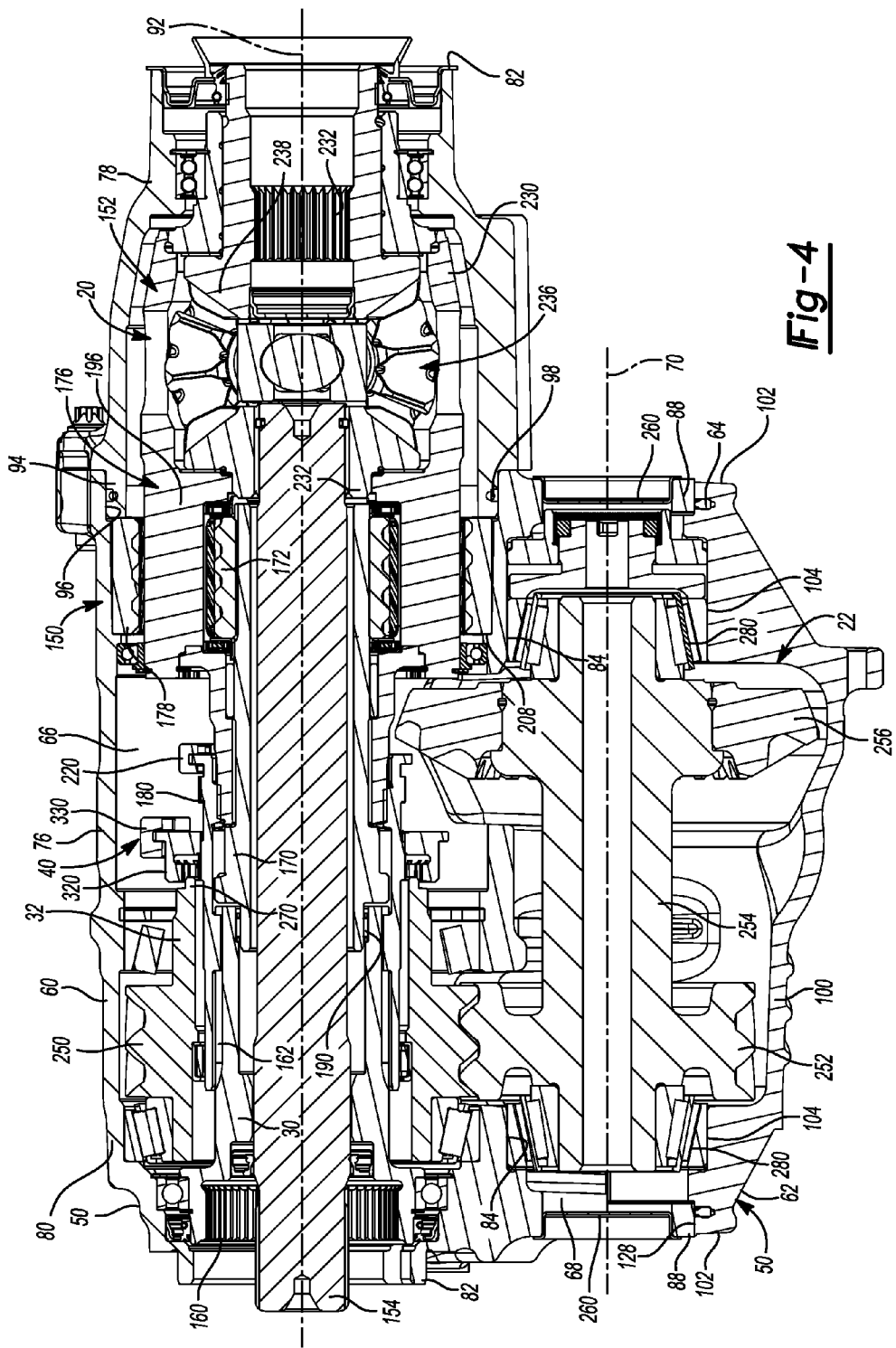
FIG. 4 is a section view taken along the line 4-4 of FIG. 2.

With reference to FIGS. 2, 3 and 4, the front axle assembly 20, the PTU 22 and the first clutch 40 are illustrated in more detail. The front axle assembly 20, the PTU 22 and the first clutch 40 can be mounted in a housing assembly 50 and can be constructed in a manner that is described in co-pending U.S. patent application Ser. No. 13/470,941 filed May 14, 2012 and entitled "Disconnectable Driveline For All-Wheel Drive Vehicle". The entire disclosure of U.S. patent application Ser. No. 13/470,941 is incorporated by reference as if set forth in its entirety herein.

The housing assembly 50 can include a first housing structure 60, a second housing structure 62 and a gasket 64. The first and second housing structures 60 and 62 can be fixedly but removably coupled to one another to define a cavity 66 and a shaft bore 68. The shaft bore 68 can be formed through the housing assembly 50 along a shaft axis 70 and can intersect the cavity 66. The first housing structure 60 can include a first housing member 76 and a second housing member 78 that can be fixedly but removably coupled to the first housing member 76.

Figure 6:
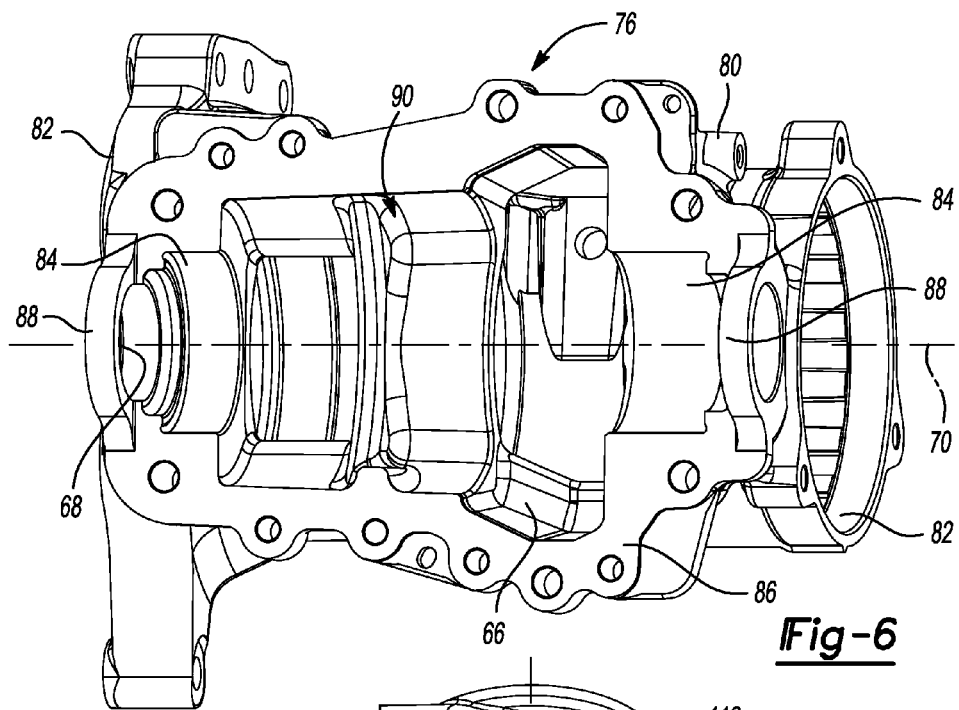
FIG. 6 is a bottom perspective view of a portion of the power transmitting component of FIG. 2 illustrating a portion of a housing assembly in more detail.

With reference to FIGS. 3, 4 and 6, the first housing member 76 can have a first wall member 80, a pair of first end walls 82, a pair of first bearing bulkheads 84, a first seal flange 86 and one or more saddles 88. The first end walls 82 can be coupled to opposite lateral sides of the first wall member 80 and can cooperate with the first wall member 80 to define a first portion 90 of the cavity 66. The first bearing bulkheads 84 can be coupled to the first wall member 80 and can be spaced apart along the shaft axis 70. The first seal flange 86 can be coupled to the first wall member 80 and the first end walls 82. The first seal flange 86 can extend about the cavity 66. Each of the saddles 88 can be an arch-shaped structure with ends that can be coupled to a corresponding one of the first end walls 82. In the particular example provided, the first housing member 76 includes a pair of the saddles 88 (i.e., one saddle 88 associated with each of the first end walls 82). It will be appreciated, however, that only one saddle 88 could be employed (i.e., on a first one of the first end walls 82) and that the first seal flange 86 could extend completely across the other one of the first end walls 82 (i.e., the opposite first end wall 82).

Figure 5:
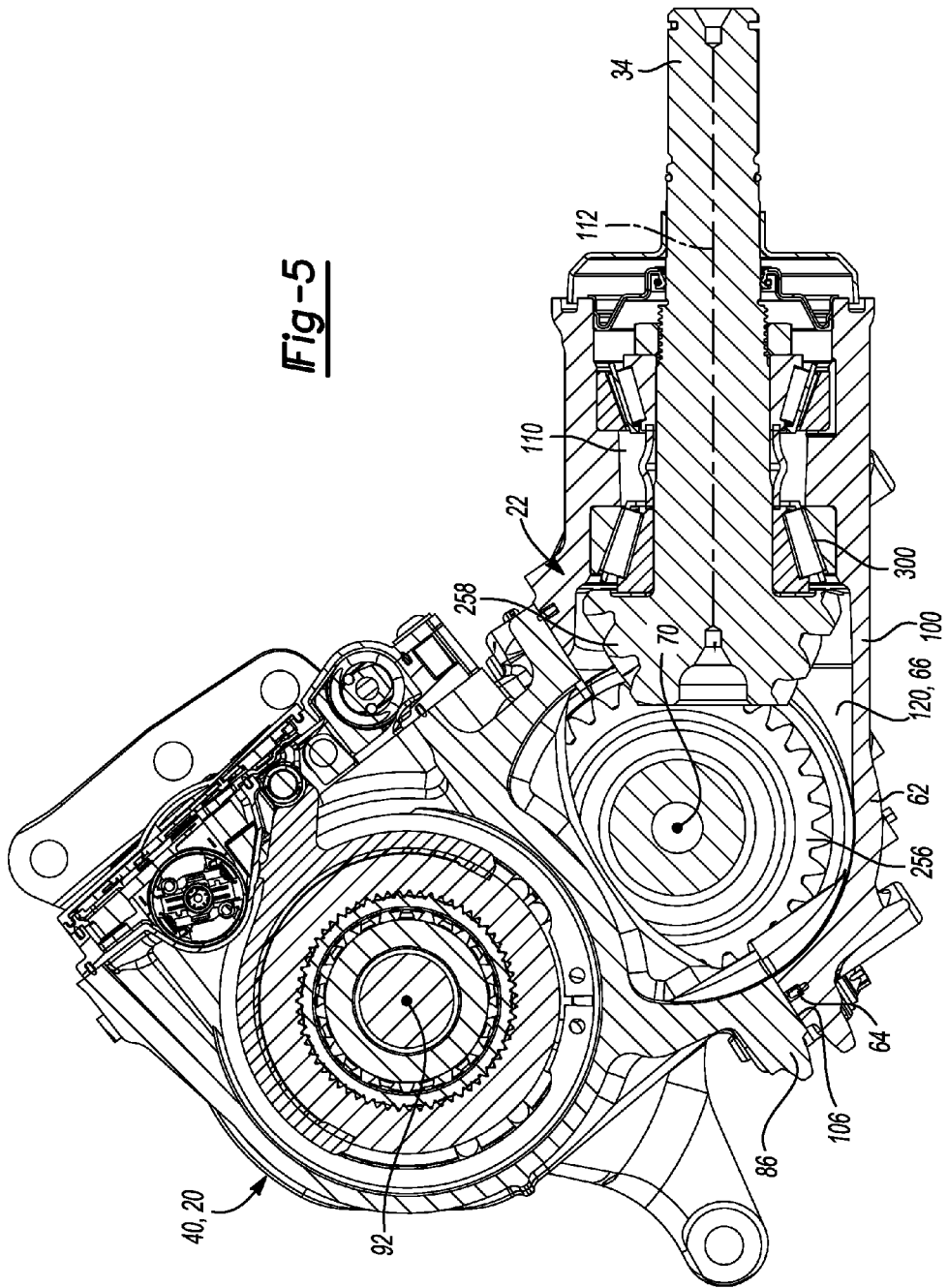
FIG. 5 is a section view taken along the line 5-5 of FIG. 2.

With reference to FIGS. 3 through 5, the second housing member 78 can be fixedly coupled to an end of the first housing member 76 and can cooperate with the first housing member 76 to define an input member axis 92. In the particular example provided, the second housing member 78 has a shoulder 94 that is received into a counterbore 96 formed into the first housing member 76. A suitable seal, such as an O-ring 98, can be mounted on the shoulder 94 and can seal the interface between the first and second housing members 76 and 78.

The second housing structure 62 can have a second wall member 100, a pair of second end walls 102, a pair of second bearing bulkheads 104, and a second seal flange 106. The second wall member 100 can define a pinion bore 110 that can be arranged about a pinion axis 112 that can be perpendicular to the shaft axis 70. The second end walls 102 can be coupled to opposite lateral sides of the second wall member 100 and can cooperate with the second wall member 100 to define a second portion 120 of the cavity 66. The second bearing bulkheads 104 can be coupled to the second wall member 100 and can be spaced apart along the shaft axis 70. Each of the second bearing bulkheads 104 can cooperate with a corresponding one the first bearing bulkheads 84 to define a respective portion of the shaft bore 68. The second seal flange 106 can be coupled to the second wall member 100 and the second end walls 102 and can extend about the cavity 66. The second seal flange 106 is configured to abut the first seal flange 86. The second end walls 102 can define saddle recesses 128 into which the saddles 88 are received.

With reference to FIG. 3, the housing assembly 50 can include a pair of locators 130 that can be coupled to the first housing structure 60 (e.g., the first housing member 76) and the second housing structure 62. The locators 130 can be configured to align the second housing structure 62 relative to the first housing structure 60. In the example provided, the locators 130 comprise dowel pins that are received into dowel holes 132 and 134 that are formed into the first and second seal flanges 86 and 106, respectively.

Figure 7:
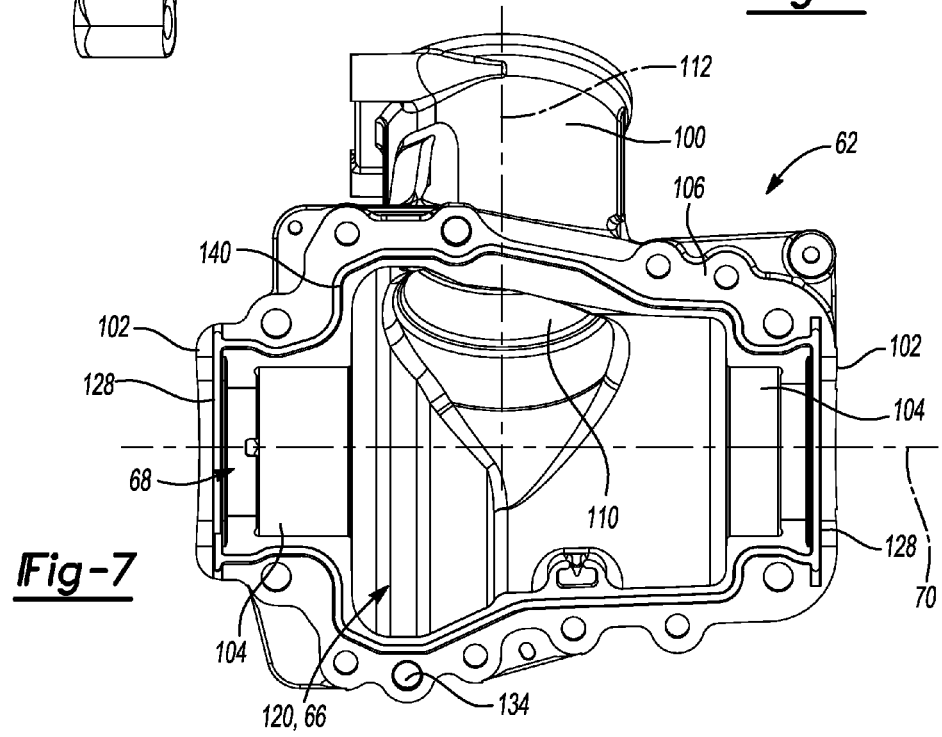
FIG. 7 is a top perspective view of a portion of the power transmitting component of FIG. 2 illustrating another portion the housing assembly in more detail.

With reference to FIGS. 3 and 7, a seal groove 140 can be formed into the first housing structure 60 (i.e., the first housing member 76) and/or the second housing structure 62. In the particular example provided, the seal groove 140 is formed only in the second housing structure 62, and more specifically, extends about the second seal flange 106 and the second end walls 102 (to thereby intersect the saddle recesses 128) in a continuous manner. The seal groove 140 is configured to receive the gasket 64.

With reference to FIGS. 3, 4 and 5, the gasket 64 can be received between the first and second seal flanges 86 and 106 and between the saddles 88 and surfaces of the saddle recesses 128 and/or the second end walls 102 to thereby seal the interface between the first and second housing structures 60 and 62. The gasket 64 can be formed in any desired manner, such as a continuous one-piece elastomer that utilizes a "press-in-place" configuration, in which the gasket 64 is a discrete component that is assembled onto the second housing structure 62, or a "molded-in-place" configuration in which the gasket 64 is molded onto (and cohesively bonded to) the second housing structure 62. Alternatively, the gasket 64 could comprise a sealant material that is dispensed onto one or both of the first and second housing structures 60 and 62.

With reference to FIGS. 4 and 8, the front axle assembly 20 can include the input member 30, a two-speed transmission 150, a front differential assembly 152 and a pair of front axle shafts 154 (only one is shown for clarity). The input member 30 can be a hollow shaft having a plurality of internal teeth or splines 160, which can be disposed on a first axial end of the input member 30 and configured to engage with the output member (not shown) of the transmission 18 (FIG. 1), and a set of first (external) range teeth 162 formed on a second, opposite end. The two-speed transmission 150 can include an input shaft 170, a sun gear 172, a plurality of planet gears (not specifically shown), a planet carrier 176, a ring gear 178 and a range collar 180. The input shaft 170 can be a hollow structure that can be co-axial with the input member 30. A needle bearing 190 can be disposed between the input shaft 170 and the input member 30. The input shaft 170 can have a set of second (external) range teeth 192 formed on an end adjacent to the input member 30. The sun gear 172 can be mounted on an end of the input shaft 170 opposite the second (external) range teeth 192 and can be coupled to the input shaft 170 for rotation therewith. The planet gears can be meshingly engaged with the sun gear 172 and the ring gear 178. The planet carrier 176 can include a carrier body 196 and a plurality of pins (not specifically shown) that can be fixedly coupled to the carrier body 196 for rotation therewith. The carrier body 196 can have a set of third (external) range teeth 198. The ring gear 178 can be meshingly engaged to the planet gears and can be non-rotatably coupled to the first housing member 76. The shoulder 94 of the second housing member 78 can clamp the ring gear 178 against a shoulder 208 in the first housing member 76 to inhibit axial movement of the ring gear 178 relative to the first housing structure 60. The range collar 180 can be a tubular sleeve that can be mounted on the input shaft 170. The range collar 180 can include fourth, fifth and sixth sets of (internal) range teeth 210, 212 and 214, respectively, that can be axially separated from one another, and a collar member 216. The fourth set of (internal) range teeth 210 can be slidably engaged to the first set of (external) range teeth 162 on the input member 30 so that the range collar 180 is coupled to the input member 30 for rotation therewith. The collar member 216 of the range collar 180 can be engaged to an actuator to permit the range collar 180 to be moved axially between first, second and third range positions. Any type of actuator (not specifically shown) can be employed, but in the example illustrated, the actuator comprises an axially movable fork 220 having a groove into which the collar member 216 is received.

Figure 9:
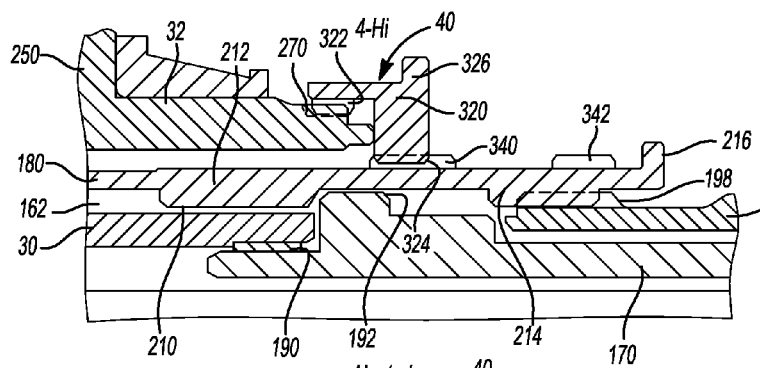
FIG. 9 is a view similar to that of FIG. 8 but illustrating the range collar in the first range position and the clutch (mode) collar in a second mode position such that a drive train of the vehicle of FIG. 1 is operated in a four-wheel, high-range drive mode.

In the first range position, which is shown in FIGS. 8 and 9, the fifth set of (internal) range teeth 212 is decoupled from the second set of (external) range teeth 192 on the input shaft 170 and the sixth set of (internal) range teeth 214 is coupled to the set of third (external) range teeth 198 on the carrier body 196 to thereby provide a "high-speed condition" in which the two-speed transmission 150 operates in a first or high-speed gear reduction.

In the second range position, which is shown in FIG. 10, the fifth set of (internal) range teeth 212 is decoupled from the second set of (external) range teeth 192 on the input shaft 170 and the sixth set of (internal) range teeth 214 is decoupled from the set of third (external) range teeth 198 on the carrier body 196 to thereby provide a "neutral condition" in which rotary power is not transmitted through the two-speed transmission 150, the front differential assembly 152 or the PTU 22.

In the third range position, which is illustrated in FIG. 11, the fifth set of (internal) range teeth 212 is coupled to the second set of (external) range teeth 192 on the input shaft 170 and the sixth set of (internal) range teeth 214 is decoupled from the set of third (external) range teeth 198 on the carrier body 196 to thereby provide a "low-speed condition" in which the two-speed transmission 150 operates in a second or low-speed gear reduction.

Returning to FIG. 4, the front differential assembly 152 can include a differential case 230, a pair of output members 232 and a means for permitting speed differentiation between the output members 232. The differential case 230 can be coupled to the carrier body 196 for rotation therewith such that the differential case 230 is rotatable about the input member axis 92. The differential case 230 can house the output members 232 and the speed differentiation means. In the example provided, the speed differentiation means comprises an open differential gearset 236 that has a pair of side gears 238 and the output members 232 can comprise portions (e.g., an internally-splined bore) of the side gears 238 to which the front axle shafts 154 are non-rotatably coupled. It will be appreciated, however that other speed differentiation means could be employed in the alternative, such as one or more clutches, a locking differential or a limited slip differential. Moreover, while the differential gearset 236 is illustrated as having bevel pinions and sidegears, it will be appreciated that the pinions and sidegears could have a parallel-axis configuration in which the pinions and side gears have spur or helical gear teeth.

The front axle shafts 154 can have a male-splined segment that can be non-rotatably coupled to the output members 232 such that the front axle shafts 154 are rotatably driven by the output members 232. One of the front axle shafts 154 can be received through the input shaft 170 and the input member 30.

The PTU 22 can include the PTU input member 32, a first intermediate gear 250, a second intermediate gear 252, a shaft 254, a ring gear 256, a pinion gear 258 (FIGS. 3 & 5), the PTU output member 34 and a pair of seal covers 260. The PTU input member 32 can comprise a plurality of first (external) mode teeth 270 that can be fixedly coupled to the first intermediate gear 250. The PTU input member 32 and the first intermediate gear 250 can be mounted in the first housing member 76 concentrically about the input member 30. The second intermediate gear 252 can be meshingly engaged to the first intermediate gear 250. The shaft 254 can be coupled to the second intermediate gear 252 for rotation therewith. A pair of shaft bearings 280 can support the shaft 254 for rotation relative to the housing assembly 50. In the particular example provided, the shaft bearings 280 comprise tapered roller bearings that are received on the first and second bearing bulkheads 84 and 104 on the first and second housing structures 60 and 62, respectively. The ring gear 256 can be mounted on the shaft 254 on an end opposite the second intermediate gear 252. The pinion gear 258 (FIGS. 3 & 5) can be received in the pinion bore 110 (FIG. 7) in the second housing structure 62 and can be supported for rotation relative to the second housing structure 62 by a set of pinion bearings 300 (FIG. 5). The pinion gear 258 (FIGS. 3 & 5) can be meshingly engaged to the ring gear 256. A bearing adjuster (not specifically shown) can be employed between the second housing structure 62 and one of the shaft bearings 280 to preload the shaft bearings 280 and/or to control the manner in which the teeth of the ring gear 256 are meshed with the teeth of the pinion gear 258 (FIGS. 3 & 5). The bearing adjuster can be constructed in a conventional manner and as such, need not be described in significant detail herein. The PTU output member 34 (FIG. 5) can be coupled to the pinion gear 258 (FIGS. 3 & 5) for rotation therewith.

The first clutch 40 can be a dog clutch that can be configured to selectively couple the PTU input member 32 to the input member 30. The first clutch 40 can have a clutch collar 320 that can be received concentrically about the input shaft 170. With additional reference to FIG. 8, the clutch collar 320 can have a second (internal) set of mode teeth 322, a third (internal) set of mode teeth 324, and an annular collar member 326. The collar member 326 can be engaged to an actuator (not specifically shown) to permit the clutch collar 320 to be moved axially along the input member axis 92 between a first mode position and a second mode position. Any type of actuator can be employed, but in the example provide, the actuator comprises an axially movable fork 330 having a groove into which the collar member 326 is received.

In the first mode position, which is illustrated in FIG. 8, the clutch collar 320 is axially separated from the PTU input member 32 such that the second (internal) set of mode teeth 322 are decoupled from the first (external) set of mode teeth 270 on the PTU input member 32. In the particular example shown, the third (internal) set of mode teeth 324 are engaged to a fourth (external) set of mode teeth 340 formed on the range collar 180 and as such, the clutch collar 320 will rotate with the range collar 180 but no rotary power will be transmitted to the PTU input member 32. Consequently, the drive train 14 (FIG. 1) will operate in a 2-wheel, high-speed mode.

In the second mode position, which is illustrated in FIGS. 9 through 11, the clutch collar 320 is engaged to the PTU input member 32 such that the second (internal) set of mode teeth 322 are coupled to the first (external) set of mode teeth 270 on the PTU input member 32.

In the example of FIG. 9, the third (internal) set of mode teeth 324 are engaged to the fourth (external) set of mode teeth 340 formed on the range collar 180 and as such the drive train 14 (FIG. 1) will operate in a 4-wheel, high-speed mode. In the example of FIG. 10, the third (internal) set of mode teeth 324 are decoupled from the fourth (external) set of mode teeth 340 formed on the range collar 180 and a fifth (external) set of mode teeth 342 formed on the range collar 180 and as such the drive train 14 (FIG. 1) will be maintained in a neutral, non-driving condition. In the example of FIG. 11, the third (internal) set of mode teeth 324 are decoupled from the fourth (external) set of mode teeth 340 formed on the range collar 180 and coupled to the fifth (external) set of mode teeth 342 formed on the range collar 180 and as such the drive train 14 (FIG. 1) will operate in a 4-wheel, low-speed mode.

With reference to FIGS. 3 and 4, each of the seal covers 260 can be received into a respective portion of the shaft bore 68 defined by one of the first end walls 82 and a corresponding one of the saddles 88. It will be appreciated that the shaft bore 68 is uninterrupted in this area (i.e., the shaft bore 68 is not split in this area) so that the seal covers 260 can be sealingly engaged to a continuous and uninterrupted surface of the shaft bore 68.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transmitting component comprising:
a housing assembly having a first housing structure, a second housing structure and a gasket, the first and second housing structures being fixedly but removably coupled to one another to define a cavity and a shaft bore, the shaft bore being formed through the housing assembly along a shaft axis and intersecting the cavity, the first housing structure having a first wall member, a pair of first end walls, a pair of first bearing bulkheads, a first seal flange, and a pair of saddles, the first end walls being coupled to opposite sides of the first wall member and cooperating with the first wall member to define a first portion of the cavity, the first bearing bulkheads being coupled to the first wall member and being spaced apart along the shaft axis, the first seal flange being coupled to the first wall member and the first end walls and extending about the cavity, each of the saddles being arch-shaped and coupled to a corresponding one of the first end walls, the shaft bore being formed through the first end walls and the saddles, the second housing structure having a second wall member, a pair of second end walls, a pair of second bearing bulkheads, and a second seal flange, the second end walls being coupled to opposite sides of the second wall member and cooperating with the second wall member to define a second portion of the cavity, the second bearing bulkheads being coupled to the second wall member and being spaced apart along the shaft axis, each of the second bearing bulkheads cooperating with a corresponding one the first bearing bulkheads to define a respective portion of the shaft bore, the second seal flange being coupled to the second wall member and the second end walls and extending about the cavity, the second seal flange being configured to abut the first seal flange, the second end walls defining saddle recesses into which the saddles are received, the gasket being received between the first and second seal flanges and between the saddles and surfaces of the saddle recesses to thereby seal an interface between the first and second housing structures; and a shaft received between the first and second bearing bulkheads and rotatable relative to the housing assembly.

2. The power transmitting component of claim 1, wherein a seal groove is formed into one of the first and second housing structures, the seal groove being configured to receive the gasket.

3. The power transmitting component of claim 2, wherein the seal groove is formed into the second seal flange and the second end walls so as to intersect the surfaces of the saddle recesses.

4. The power transmitting component of claim 1, wherein the housing assembly comprises a pair of locators that are coupled to the first and second housing structures and configured to align the second housing structure relative to the first housing structure.

5. The power transmitting component of claim 4, wherein the locators comprise dowel pins.

6. The power transmitting component of claim 1, further comprising shaft bearings disposed between the shaft and each pair of the first and second bearing bulkheads.

7. The power transmitting component of claim 1, further comprising a pair of seal covers, each of the seal covers being received into a portion of the shaft bore that is defined by one of the first end walls and a corresponding one of the saddles.

8. The power transmitting component of claim 1, further comprising a ring gear mounted to the shaft and a pinion gear that is received in a pinion bore formed in the second housing structure, the pinion gear being meshed with the ring gear.

9. A power transmitting component comprising:

a housing assembly having a first housing structure, a second housing structure and a gasket, the first and second housing structures being fixedly but removably coupled to one another to define a cavity and a shaft bore, the shaft bore being formed through the housing assembly along a shaft axis and intersecting the cavity, the first housing structure having a first wall member, a pair of first end walls, a pair of first bearing bulkheads, a first seal flange, and a pair of saddles, the first end walls being coupled to opposite sides of the first wall member and cooperating with the first wall member to define a first portion of the cavity, the first bearing bulkheads being coupled to the first wall member and being spaced apart along the shaft axis, the first seal flange being coupled to the first wall member and the first end walls and extending about the cavity, each of the saddles being arch-shaped and coupled to a corresponding one of the first end walls, the shaft bore being formed through the first end walls and the saddles, the second housing structure having a second wall member, a pair of second end walls, a pair of second bearing bulkheads, and a second seal flange, the second end walls being coupled to opposite sides of the second wall member and cooperating with the second wall member to define a second portion of the cavity, the second bearing bulkheads being coupled to the second wall member and being spaced apart along the shaft axis, each of the second bearing bulkheads cooperating with a corresponding one the first bearing bulkheads to define a respective portion of the shaft bore, the second seal flange being coupled to the second wall member and the second end walls and extending about the cavity, the second seal flange being configured to abut the first seal flange, the second end walls defining saddle recesses into which the saddles are received, the gasket being received between the first and second seal flanges and between the saddles and surfaces of the saddle recesses to thereby seal an interface between the first and second housing structures;

an input member received in the first housing structure for rotation about an input member axis that is parallel to the shaft axis;

a differential assembly received in the first housing and configured to be driven by the input member for rotation about the input member axis;

a shaft received between the first and second bearing bulkheads and rotatable relative to the housing structure assembly;

a ring gear mounted on the shaft; and a pinion gear supported for rotation in the second housing structure and meshingly engaged to the ring gear.

10. The power transmitting component of claim 9, further comprising a transmission disposed between the input member and the differential assembly.

11. The power transmitting component of claim 10, wherein the transmission is a multi-speed transmission.

12. The power transmitting component of claim 10, further comprising a clutch for selectively coupling a first intermediate gear to a case of the differential assembly, the first intermediate gear being meshingly engaged to a second intermediate gear that is coupled to the shaft for rotation therewith.

13. The power transmitting component of claim 12, wherein a seal groove is formed into one of the first and second housing structures, the seal groove being configured to receive the gasket.

14. The power transmitting component of claim 13, wherein the seal groove is formed into the second seal flange and the second end walls so as to intersect the surfaces of the saddle recesses.

15. The power transmitting component of claim 12, wherein the housing assembly comprises a pair of locators that are coupled to the first and second housing structures and configured to align the second housing structure relative to the first housing structure.

16. The power transmitting component of claim 15, wherein the locators comprise dowel pins.

17. The power transmitting component of claim 12, further comprising shaft bearings disposed between the shaft and each pair of the first and second bearing bulkheads.

18. The power transmitting component of claim 12, further comprising a pair of seal covers, each of the seal covers being received into a portion of the shaft bore that is defined by one of the first end walls and a corresponding one of the saddles.

* * * * *

UNITED STATES PATENT AND TRADEMARK OFFICE
CERTIFICATE OF CORRECTION

| | | |
|---|---|---|
| PATENT NO. | : 8,857,293 B2 | Page 1 of 1 |
| APPLICATION NO. | : 13/792355 | |
| DATED | : October 14, 2014 | |
| INVENTOR(S) | : Scott P. McGuire et al. | |

It is certified that error appears in the above-identified patent and that said Letters Patent is hereby corrected as shown below:

In the Claims

Col. 10, Line 8, after "one", insert --of--, therefor;

Col. 10, Line 22, after "housing", insert --structure--, therefor; and

Col. 10, Line 26, delete "structure".

Signed and Sealed this
Third Day of February, 2015

Michelle K. Lee
*Deputy Director of the United States Patent and Trademark Office*